(12) United States Patent
Ankney

(10) Patent No.: US 12,337,990 B2
(45) Date of Patent: Jun. 24, 2025

(54) FIBER OPTIC ACTUATOR OVERLOAD TRIP SENSOR

(71) Applicant: Hamilton Sundstrand Corporation, Charlotte, NC (US)

(72) Inventor: Darrell E. Ankney, Dixon, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 197 days.

(21) Appl. No.: 18/154,503

(22) Filed: Jan. 13, 2023

(65) Prior Publication Data
US 2024/0239511 A1 Jul. 18, 2024

(51) Int. Cl.
*B64D 45/00* (2006.01)
*B64F 5/60* (2017.01)
*G01D 5/26* (2006.01)

(52) U.S. Cl.
CPC .............. *B64D 45/00* (2013.01); *B64F 5/60* (2017.01); *G01D 5/266* (2013.01); *B64D 2045/0085* (2013.01)

(58) Field of Classification Search
CPC ............ B64D 45/00; B64D 2045/0085; B64D 2045/001; B64D 45/0005; B64F 5/60; G01D 5/266; G01L 3/08; G01L 3/1421
USPC .......................................................... 701/14
See application file for complete search history.

(56) References Cited

U.S. PATENT DOCUMENTS

| | | | |
|---|---|---|---|
| 7,708,226 B2 | 5/2010 | Schievelbusch | |
| 8,022,835 B2* | 9/2011 | Coleman | G01D 5/35303 |
| | | | 359/638 |
| 9,063,549 B1* | 6/2015 | Pennecot | G01S 17/93 |
| 10,447,397 B2* | 10/2019 | Barad | H04B 10/2589 |
| 10,501,201 B2 | 12/2019 | Harrington et al. | |
| 10,543,902 B2 | 1/2020 | Popoola et al. | |
| 11,385,097 B1 | 7/2022 | Allstot et al. | |
| 11,912,433 B2* | 2/2024 | Chen | B64D 45/00 |
| 2004/0251382 A1* | 12/2004 | Schievelbusch | B64C 9/16 |
| | | | 244/99.2 |
| 2018/0145751 A1* | 5/2018 | Barad | H04B 10/2589 |
| 2019/0337635 A1* | 11/2019 | Ankney | B64D 45/0005 |
| 2020/0183125 A1* | 6/2020 | Zhou | G01S 17/42 |
| 2020/0331625 A1 | 10/2020 | Iliescu et al. | |
| 2021/0237857 A1 | 8/2021 | Haserodt et al. | |
| 2024/0166334 A1* | 5/2024 | Ankney | B64C 13/16 |
| 2024/0239511 A1* | 7/2024 | Ankney | G01L 3/1421 |

OTHER PUBLICATIONS

European Search Report for EP Application No. 23218868; dated May 31, 2024; 7 pages.

\* cited by examiner

*Primary Examiner* — Tyler D Paige
(74) *Attorney, Agent, or Firm* — CANTOR COLBURN LLP

(57) ABSTRACT

An apparatus and a method of determining a state of an actuator in an airplane. The apparatus includes a mirror coupled to the actuator, wherein a location of the mirror is dependent on the state of the actuator, a shaft for moving the mirror upon a change in the state of the actuator, and a processor. Incident light is reflected off of the mirror to create a reflected light. The processor receives the reflected light from the mirror, detects a change in a parameter of the reflected light generated by moving of the mirror, and determines the state of the actuator based on the change in the parameter.

7 Claims, 4 Drawing Sheets

FIBER OPTIC ACTUATOR OVERLOAD TRIP SENSOR

BACKGROUND

Embodiments of the present disclosure relate to airplane operations and, more particular, to a system and method for detecting an overload torque at a slat and/or a flap on a wing of an airplane.

An airplane wing generally includes a slat at its forward surface and a flap at its anterior to perform different flight operations. An actuator is used to control a position of the slat and/or the flap. When an actuator experiences an over-torque condition, an over-torque indicator on the actuator is released. The actuator is a mechanical actuator that can be inspected only when the airplane is safely on the ground. However, the effects of an over-torque condition can be critical to flight of the airplane. Therefore, there is a need for an over-torque indicator that can relay an over-torque condition to the pilot while the airplane is in flight.

BRIEF DESCRIPTION

According to an embodiment, a method of determining a state of an actuator in an airplane is disclosed. The method includes reflecting incident light off of a mirror coupled to the actuator to create a reflected light, wherein a location of the mirror is dependent on the state of the actuator, moving the mirror upon a change in the state of the actuator, detecting a change in a parameter of the reflected light generated by moving of the mirror, and determining the state of the actuator based on the change in the parameter.

In addition to one or more of the features described above, the mirror is coupled to the actuator via a spring and the spring moves the mirror based on the state of the actuator.

In addition to one or more of the features described above, the method further includes translating a wedge via the spring to move the mirror.

In addition to one or more of the features described above, the spring is held in a non-equilibrium position by a mechanical trip indicator under normal operation of the actuator and is released by the mechanical trip indicator to relax to its equilibrium position when the actuator is over-torqued.

In addition to one or more of the features described above, the parameter of the reflected light is a phase of the reflected light.

In addition to one or more of the features described above, the method further includes detecting a change in the phase using an interferometer.

In addition to one or more of the features described above, the method further includes controlling an operation of the airplane based on the state of the actuator.

In addition to one or more of the features described above, the method further includes controlling at least one of: (i) a slat of the airplane; and (ii) a flap of the airplane.

According to another embodiment, an apparatus for detecting a state of an actuator in an airplane is disclosed. The apparatus includes a mirror coupled to the actuator, wherein a location of the mirror is dependent on the state of the actuator, a shaft for moving the mirror upon a change in the state of the actuator, and a processor. The processor is configured to project incident light onto the mirror, receive reflected light from the mirror, detect a change in a parameter of the reflected light generated by moving of the mirror, and determine the state of the actuator based on the change in the parameter.

In addition to one or more of the features described above, the apparatus further includes a spring coupled to the shaft, wherein the spring moves the shaft based on the state of the actuator.

In addition to one or more of the features described above, the apparatus further includes a wedge coupled to the shaft, wherein the wedges moves with the shaft to move the mirror.

In addition to one or more of the features described above, the spring is held in a non-equilibrium position by a mechanical trip indicator under normal operation of the actuator and is released by the mechanical trip indicator to relax to its equilibrium position when the actuator is over-torqued.

In addition to one or more of the features described above, the parameter of the reflected light is a phase of the reflected light.

In addition to one or more of the features described above, the apparatus further includes an interferometer configured to detect a change in the phase.

In addition to one or more of the features described above, the processor is further configured to control at least one of: (i) an operation of the airplane based on the state of the actuator; (ii) a slat of the airplane; and (iii) a flap of the airplane.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
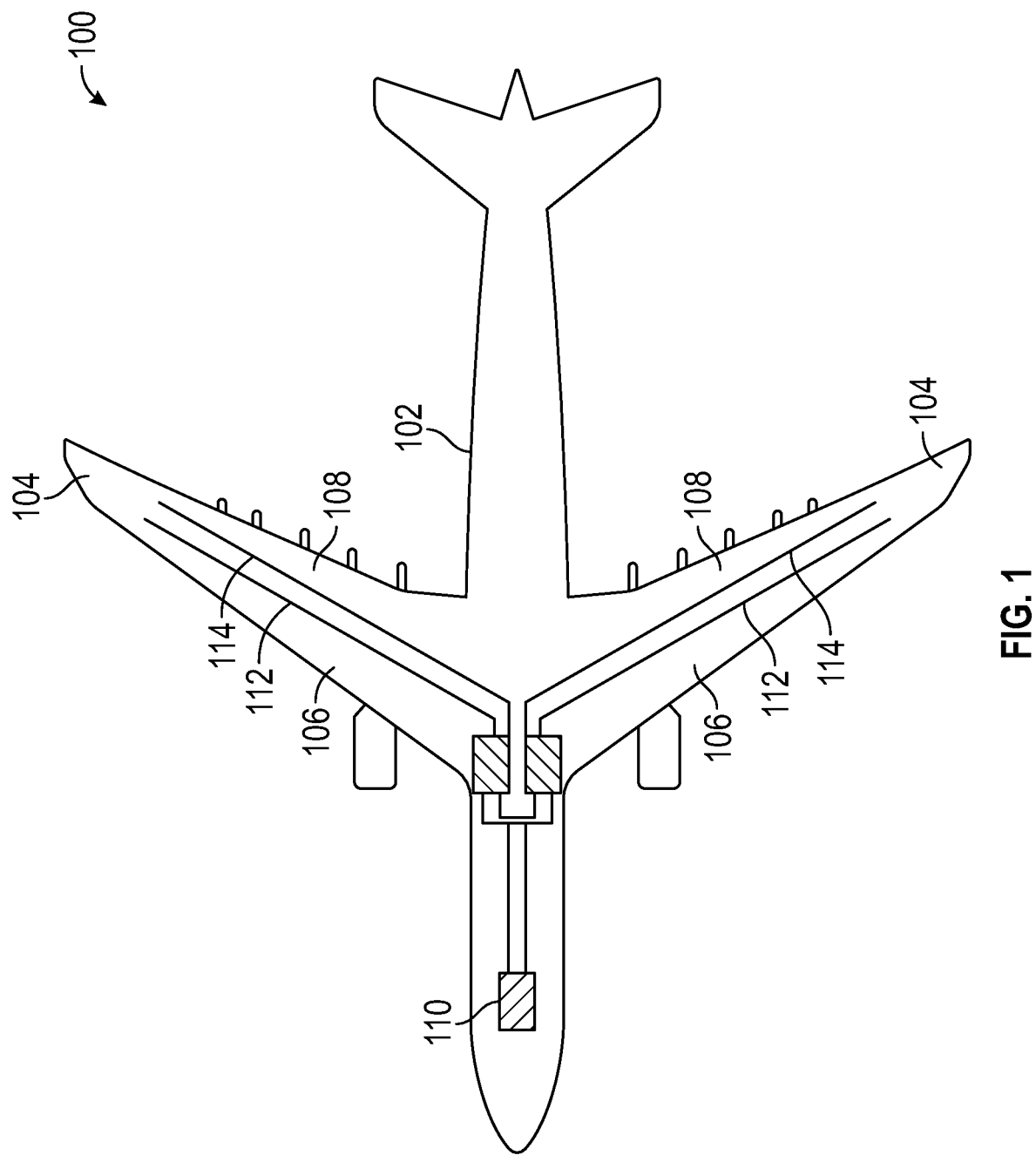
FIG. 1 shows an airplane in a plan view.

With reference now to FIG. 1, an airplane 100 is shown in a plan view. The airplane 100 includes a fuselage 102 and wings 104. Each wing 104 includes a slat 106 and a flap 108. In various embodiments, a wing 104 can include a plurality of slats and/or a plurality of flaps 108. A slat 106 is a surface on a forward or leading edge of the wing 104. When deployed, a slat 106 allows the wing 104 to operate at a higher angle of attack. A flap 108 is a surface on a trailing edge of the wing 104 and is used to increase a drag on the airplane 100 when deployed.

A cockpit 110 sends signals for controlling the operation of the slats 106 and the flaps. The cockpit 110 can include a controller including a processor for controlling various operations of the airplane 100. In various embodiments, the cockpit 110 sends an optical slat/flap command along one or more optical fibers. As shown in FIG. 1, a slat control optical fiber 112 extends along a wing 104 to one or more of the slats 106 and a flap control optical fiber 114 extends along a wing 104 to one or more of the flaps 108.

Figure 2:
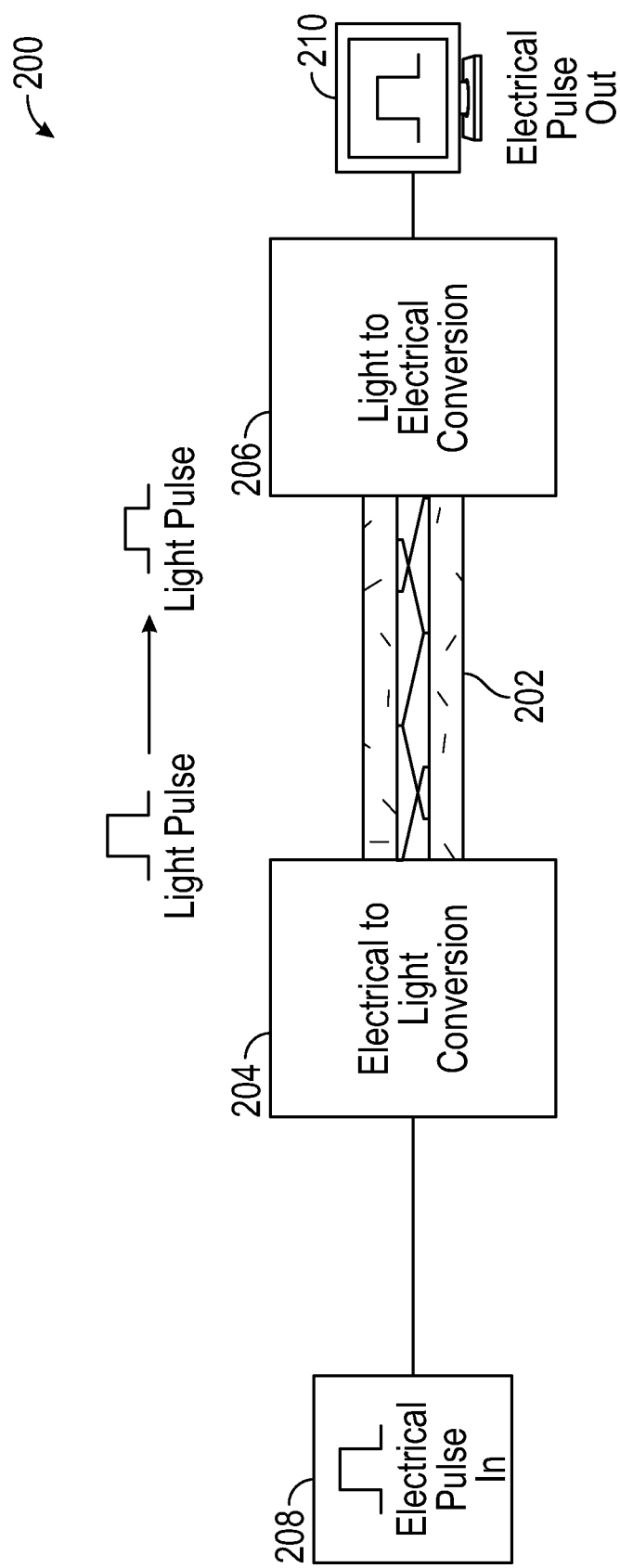
FIG. 2 shows a schematic diagram of an optical communication system within the airplane, in an embodiment.

FIG. 2 shows a schematic diagram 200 of an optical communication system within the airplane 100, in an embodiment. An optical fiber 202 extends between a first converter 204 and a second converter 206. The first converter 204 converts an electrical signal to an optical signal and converts an optical signal to an electrical signal. Similarly, the second converter 206 converts an electrical signal to an optical signal and converts an optical signal to an electrical signal. The first converter 204 can be located at a cockpit 110 of the airplane 100 or at the controller. The second converter 206 can be at or near an actuator of one of the slats 106 or flaps 108. To control the slats 106 and/or flaps 108, a command signal (e.g., generated at the controller) is received at the first converter 204, which converts the command signal to an optical signal that is sent from the first converter 204 over the optical fiber 202 to the second converter 206. The second converter 206 converts the optical signal back to an electrical signal which is used as a local control circuit 210 to control the operation of the slat 106 and/or flaps 108. For communication in the other direction, the local control circuit 210 can generate an electrical signal. The second converter 206 converts the electrical signal to an optical signal that is sent over the optical fiber 202 to the first converter 204. The first converter 204 converts the optical signal back to an electrical signal which is sent to the controller 208. The controller 208 can used the signal to control various operations of the airplane 100, such as controlling operation of other slat 106 and/or flaps 108, etc. In addition, the controller 208 can response to the signal by generating a message at a screen, an audio signal, etc.

Figure 4:
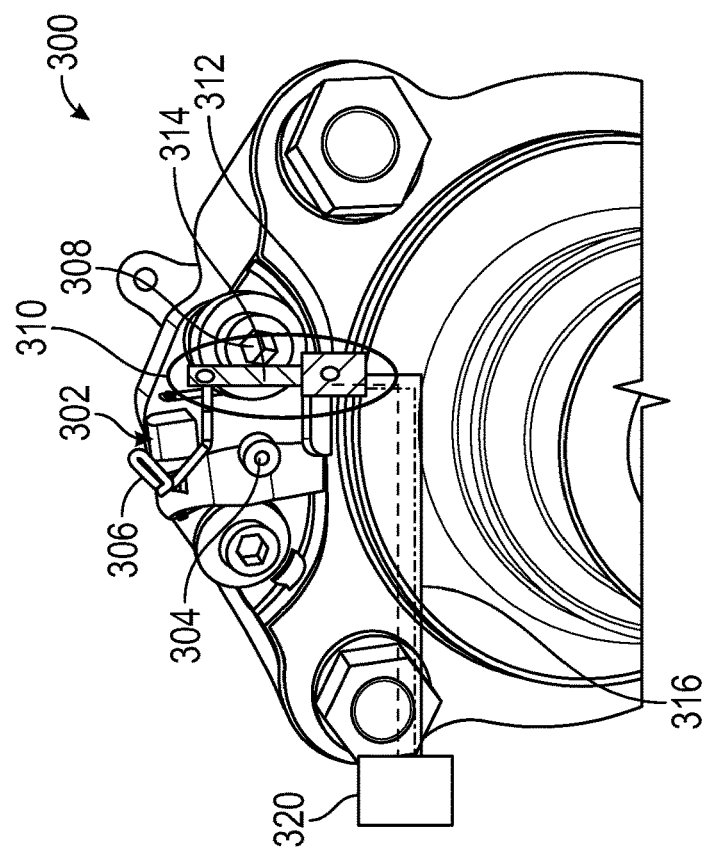
FIG. 4 shows a side view of the actuator under an over-torqued condition including the trip indicator in a tripped state.
Figure 3:
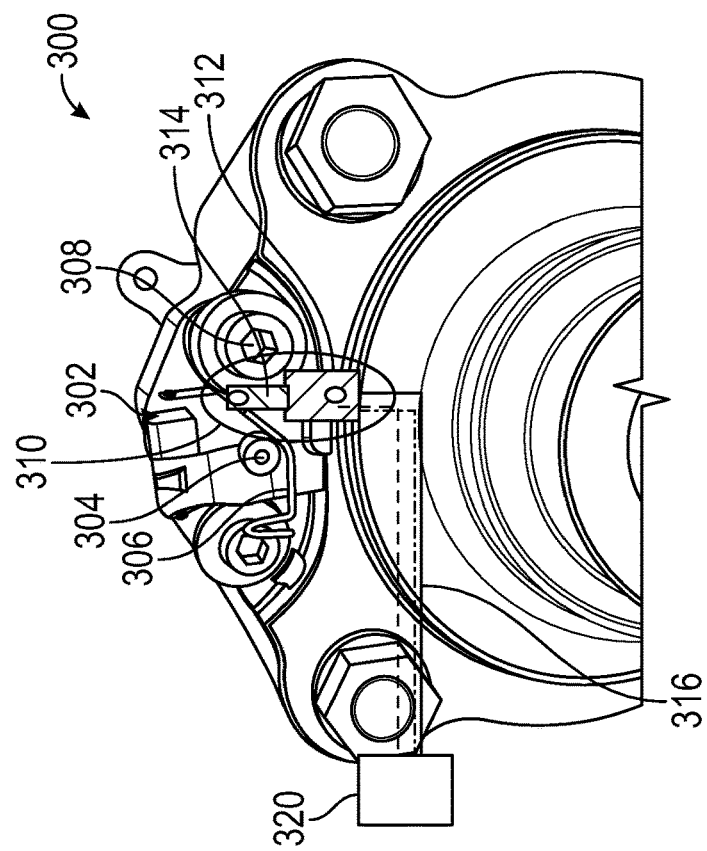
FIG. 3 shows a side view of an actuator under normal operations including a trip indictor in a non-tripped state.

Reference is now made to FIGS. 3 and 4 to discuss operation of and actuator for a slat or flap and an associated trip indicator. FIG. 3 shows a side view of an actuator 300 under normal operations including a trip indictor in a non-tripped state. FIG. 4 shows a side view of the actuator 300 under an over-torqued condition including the trip indicator in a tripped state.

The actuator 300 includes a mechanical trip indicator 302 that includes a mechanical trip member 304 that changes its position when the actuator 300 is over-torqued. In an embodiment, the mechanical trip member 304 is a poppet disposed in a passage. During normal operations of the actuator 300, the poppet that extends from the passage. When the actuator 300 is over-torqued, the poppet recedes into the passage. A spring 306 is fastened at one end to an anchor point 308 of the actuator 300 and is held in a first position (i.e., away from its equilibrium position) by the poppet when the poppet is extended from the passage (i.e., during normal operation). When the poppet recedes in the passage (i.e., during over-torquing), it released the spring 306, thereby allowing the spring 306 to move to a second position (i.e., its equilibrium position).

The actuator 300 includes an optical device 310 coupled to the spring 306 and thus coupled to the mechanical trip member 304. The optical device 310 includes a body 312 having a cavity (shown in FIG. 5) and a shaft 314 that is moveable in and out of the cavity. The shaft 314 is attached to the spring 306 such that the shaft 314 moves when the spring moves between the non-tripped state (FIG. 3) and the tripped state (FIG. 4).

An optical fiber 316 extends between the body 312 of the optical device 310 to an optical interrogator 320. The optical interrogator 320 can includes a light source or laser for generating a first beam of light (e.g., incident light) and a detector for receiving and detecting a second beam of light (e.g., reflected light). The optical interrogator 320 can also include a processor that controls operation of the light source and detector and performs various calculations to determine a change in a parameter of the reflected light with respect to the incident light. The processor can also perform calculations to determine a state of the actuator based on the change in the parameter. In various embodiments, the parameter is a phase of the light.

The optical interrogator 320 sends light into the body 312 via the optical fiber 316 and receives a reflection of the light from the body 312 that is reflected back along the optical fiber 316. When the actuator 300 changes from a non-tripped state (FIG. 3) to a tripped state (FIG. 4), the poppet is pulled into its passage, thereby releasing the spring allowing the spring to relax to its equilibrium position (the second position). As the spring relaxes, it moves the shaft 314. As discussed with respect to FIG. 5, the shaft affects a phase of the reflected light. Thus, the optical interrogator 320 can record this change of phase and can determine that the actuator is over-torqued by detecting this change of phase.

Figure 5:
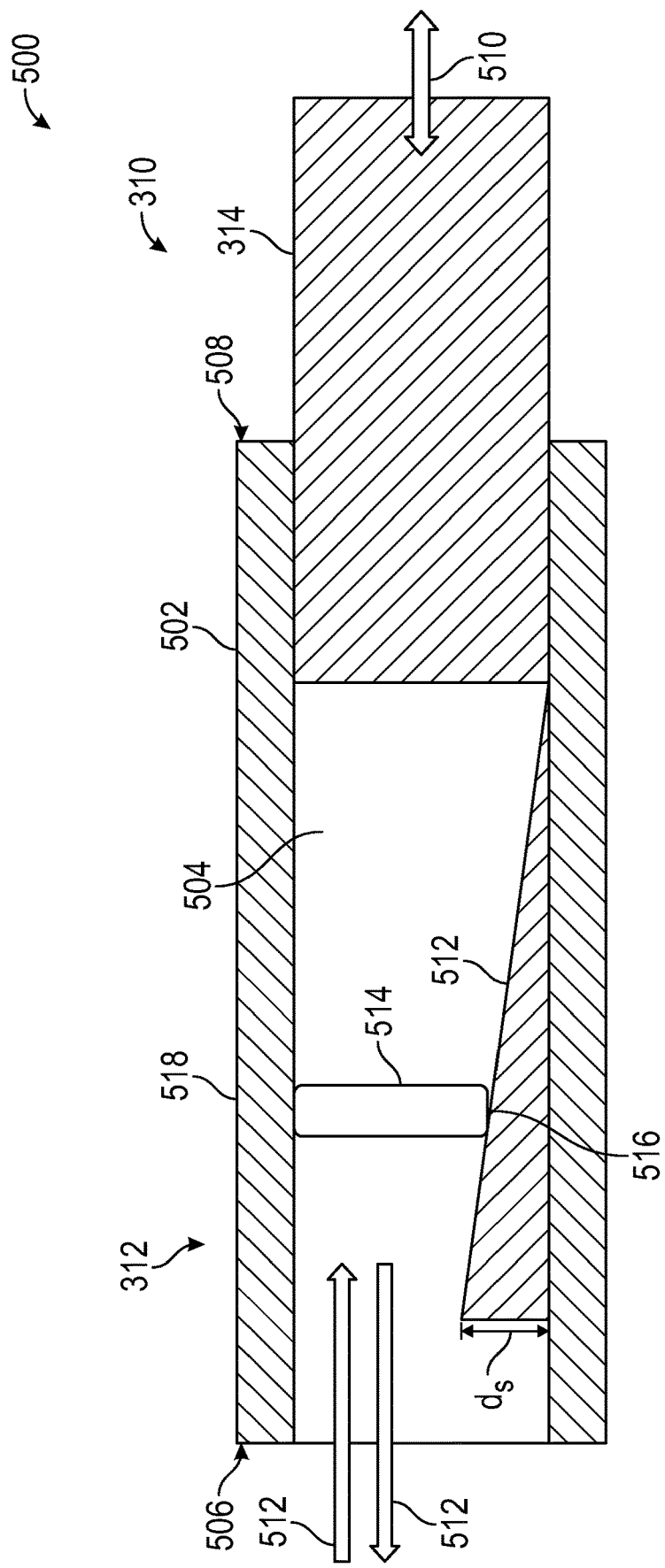
FIG. 5 shows a detailed view of the optical device, in an embodiment.

FIG. 5 shows a detailed view 500 of the optical device 310, in an embodiment. In an embodiment, the optical device 310 is a linear position transducer. The optical device 310 includes a housing 502 forming a cavity 504 extending along a longitudinal axis from a first end 506 to a second end 508. The shaft 314 is located at the second end 508 and is slidable along a translation direction 510 parallel to the longitudinal axis. A wedge 512 is located within the cavity 504 and is mechanically coupled to the shaft 314. In one embodiment, the wedge 512 can be made of a birefringent material. The wedge 512 has a maximum thickness $\delta_s$ at an end distal from the shaft 314 and a thickness of the wedge changes linearly along its length.

A reflection polarizer 514 or mirror is disposed at a location within the cavity 504. In an embodiment, the mirror is a planar mirror in which the plane of the mirror perpendicular or substantially perpendicular to the longitudinal axis to the cavity 504. The plane of the mirror is also perpendicular or substantially perpendicular to the direction of propagation of light within the cavity 504. The position or location of the mirror along the longitudinal axis of the cavity 504 and/or the orientation of the mirror within the cavity 504 is affected by the position of the wedge 512. In one embodiment, the wedge 512 makes contact with a bottom edge 516 of the mirror while the top edge 518 is attached to the housing 502. As the shaft 314 moves, the wedge 512 is moved along the translation direction, thereby changing the contact point between the wedge 512 and the mirror. The mirror tilts as the contact point changes. For example, as the wedge moves toward the first end 506, the mirror can tilt such that its bottom edge 516 is closer to the first end 506 than the top edge 518. In another embodiment, the mirror is attached only to the wedge 512 and moves along the longitudinal axis along with the wedge 512.

An end of the optical fiber 316 is placed at the opening of the first end 506. To operate the optical device 310, incident light 520 is introduced into the cavity 504 at the first end 506 by the optical fiber 316 and propagates along the longitudinal axis in the direction of the second end 508. The incident light reflects off the mirror to form reflected light 522 which is returned to the optical fiber 316. As the mirror moves or is tilted, it introduces a phase change into the reflected light 522. This phase change $\delta_s$ is shown in Eq. (1):

$$\delta_s = 2Bd_s \qquad \text{Eq. (1)}$$

where $\delta_s$ is the maximum thickness of the wedge 512 and B is a phase angle associated with a difference between a first position of the mirror (a non-tripped position) and a second position of the mirror (a tripped position). The reflected light 522 is returned to the optical interrogator 320 via the optical fiber 316. In various embodiments, the optical interrogator 320 can include an interferometer, with the optical fiber 316 and mirror acting as an arm of the interferometer. The optical interrogator 320 detects the change in phase caused by the motion of the mirror. Since the movement of the mirror is caused by movement of the shaft 314 which is due to movement of the spring 306, which is due to the movement of the mechanical trip member 304, the optical interrogator 320 can determine whether the actuator 300 is in an over-torqued state or in a normal operating state by measured the phase shift of the light, or lack thereof.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of controlling operation of an airplane, comprising:
    reflecting incident light off of a mirror to create a reflected light, wherein the mirror is coupled to an actuator via a spring, spring is held in a non-equilibrium position by a mechanical trip indicator of the actuator under normal operation of the actuator, and the actuator is coupled to a slat or a flap of the airplane;
    moving the mechanical trip indicator when the actuator is over torqued to allow the spring to relax to its equilibrium position, thereby moving the mirror;
    detecting a change in a phase of the reflected light generated by moving the mirror;
    determining the actuator to be over-torqued based on the change in the phase; and
    controlling operation of another slat or another flap based on the actuator being over-torqued to control operation of the airplane.

2. The method of claim 1, wherein moving the mirror further comprises tilting the mirror.

3. The method of claim 2, further comprising translating a wedge via the spring to tilt the mirror.

4. The method of claim 1, further comprising detecting the change in the phase using an interferometer that includes the mirror as an arm of the interferometer.

5. An apparatus for controlling an airplane, comprising:
    an actuator for controlling a slat or a flap of the airplane;
    a spring held in a non-equilibrium position by a mechanical trip indicator of the actuator under normal operation of the actuator, wherein the mechanical trip indicator moves when the actuator is over-torqued to allow the spring to relax to its equilibrium position;
    a shaft configured to move via the spring;
    a mirror movable via the shaft;
    a processor configured to:
        project incident light onto the mirror;
        receive reflected light from the mirror;
        detect a change in a phase of the reflected light generated by moving the mirror; and
        determine the actuator to be over-torqued based on the change in the phase; and
        control operation of another slat or another flap based on the actuator being over-torqued to control operation of the airplane.

6. The apparatus of claim 5, further comprising a wedge coupled to the shaft, wherein the wedges moves with the shaft to tilt the mirror.

7. The apparatus of claim 6, further comprising an interferometer that includes the mirror as an arm of the interferometer and is configured to detect the change in the phase.

* * * * *